(12) United States Patent
Antonacci (10) Patent No.: US 9,771,161 B2
(45) Date of Patent: Sep. 26, 2017

(54) BEAM WITH HYBRID CROSS-SECTIONAL STRUCTURE

(71) Applicant: ROHR, Inc., Chula Vista, CA (US)

(72) Inventor: Moreno Antonacci, Carlsbad, CA (US)

(73) Assignee: ROHR, INC, Chula Vista, CA (US)

( * ) Notice: Subject to any disclaimer, the term of this patent is extended or adjusted under 35 U.S.C. 154(b) by 18 days.

(21) Appl. No.: 14/801,323

(22) Filed: Jul. 16, 2015

(65) Prior Publication Data

US 2017/0015431 A1 Jan. 19, 2017

(51) Int. Cl.
| | |
|---|---|
| *B64C 1/00* | (2006.01) |
| *B64D 29/08* | (2006.01) |
| *B64D 29/06* | (2006.01) |
| *E05D 3/02* | (2006.01) |
| *E04C 3/04* | (2006.01) |
| *E04C 3/02* | (2006.01) |
| *E05D 9/00* | (2006.01) |

(52) U.S. Cl.
CPC ............. *B64D 29/08* (2013.01); *B64D 29/06* (2013.01); *E04C 3/02* (2013.01); *E04C 3/04* (2013.01); *E05D 3/02* (2013.01); *E05D 9/00* (2013.01); *E04C 2003/0421* (2013.01); *E04C 2003/0452* (2013.01); *E04C 2003/0465* (2013.01); *E05Y 2900/502* (2013.01)

(58) Field of Classification Search
CPC ........... B64D 29/06; B64D 29/08; E04C 3/02; E04C 3/04; E04C 2003/0421; E04C 2003/0452; E04C 2003/465; E05D 3/02; E05D 9/00
See application file for complete search history.

(56) References Cited

U.S. PATENT DOCUMENTS

| | | | |
|---|---|---|---|
| 5,350,136 A | 9/1994 | Prosser et al. | |
| 6,375,121 B1 | 4/2002 | Porte et al. | |
| 7,155,874 B2 * | 1/2007 | Lee ........................... | E04B 1/24 |
| | | | 52/843 |
| 8,322,653 B2 | 12/2012 | Welch et al. | |
| 8,657,323 B2 * | 2/2014 | Pedersen ................... | B60P 3/06 |
| | | | 280/404 |
| 2004/0093825 A1 | 5/2004 | Lee | |
| 2006/0096192 A1 * | 5/2006 | Daudet ...................... | E04B 1/24 |
| | | | 52/204.1 |
| 2007/0294996 A1 | 12/2007 | Stephan et al. | |
| 2008/0258016 A1 | 10/2008 | Gukeisen et al. | |
| 2009/0129922 A1 | 5/2009 | Cloft et al. | |
| 2011/0197546 A1 * | 8/2011 | Shuhaibar .............. | B21D 47/01 |
| | | | 52/837 |

FOREIGN PATENT DOCUMENTS

| | | |
|---|---|---|
| JP | H09177186 A | 7/1997 |
| WO | 2015017492 A1 | 2/2015 |

OTHER PUBLICATIONS

EP Patent Application No. 16179671.9-1754, EP SR, Issued Dec. 7, 2016, U310630EP, 6 pages.

* cited by examiner

*Primary Examiner* — Philip J Bonzell
(74) *Attorney, Agent, or Firm* — Cantor Colburn LLP (57) ABSTRACT

A beam with a hybrid cross-sectional structure is provided. The beam includes a first section having a first cross-sectional I-beam structure, a second section having a second cross-sectional box-beam structure and a third section. The third section is interposed between the first and second sections and incorporating the first and second cross-sectional I-beam and box-beam structures.

8 Claims, 8 Drawing Sheets

BEAM WITH HYBRID CROSS-SECTIONAL STRUCTURE

BACKGROUND OF THE DISCLOSURE

The subject matter disclosed herein relates to a beam with a hybrid cross-sectional structure and, more particularly, to a beam with an I-beam cross-sectional structure at a first section and a box-beam cross-sectional structure at a second section.

Cast parts for aircraft components are commonly used due to their relatively low cost, ease of manufacturing and that fact that cast parts can present options for structural designs that cannot be achieved through machining, for example. However, since the casting process can result in cast materials being relatively weaker than machined materials, cast parts are often designed to be larger than they might otherwise need to be.

Currently, hinges are provided in many fan cowl assemblies of aircraft engines in order to connect a frame structure to the fan cowl. These hinges are normally designed as a machined part but options for alternative structural hinge designs would be opened up if the hinges could be produced by casting.

BRIEF DESCRIPTION OF THE DISCLOSURE

According to one aspect of the disclosure, a beam with a hybrid cross-sectional structure is provided. The beam includes a first section having a first cross-sectional I-beam structure, a second section having a second cross-sectional box-beam structure and a third section. The third section is interposed between the first and second sections and incorporating the first and second cross-sectional I-beam and box-beam structures.

In accordance with additional or alternative embodiments, the first cross-sectional structure includes a central web, a first flange disposed on a first side of the central web and a second flange disposed on a second side of the central web, which is opposite the first side.

In accordance with additional or alternative embodiments, the first flange includes an angular break and the second flange is tapered.

In accordance with additional or alternative embodiments, the second cross-sectional structure includes first and second lateral webs extending between the first and second flanges.

In accordance with additional or alternative embodiments, respective portions of the first and second lateral webs overlap with a corresponding portion of the central web at the third section.

According to another aspect of the disclosure, a beam with a hybrid cross-sectional structure is provided. The beam includes a first section having an I-beam cross-sectional structure that includes a central web, a first flange disposed on a first side of the central web and a second flange disposed on a second side of the central web, which is opposite the first side, a second section having a box-beam cross-sectional structure that includes first and second lateral webs extending between the first and second flanges and a third section interposed between the first and second sections and incorporating overlapped I-beam and box-beam cross-sectional structures.

In accordance with additional or alternative embodiments, the first flange includes an angular break and the second flange is tapered.

In accordance with additional or alternative embodiments, respective portions of the first and second lateral webs overlap with a corresponding portion of the central web at the third section.

According to another aspect of the disclosure, a hinge is provided. The hinge includes a spine portion, a web portion disposed along the spine portion and a lug portion disposed at an end of the spine portion. The spine portion includes a first section having a first cross-sectional I-beam structure, a second section having a second cross-sectional box-beam structure and a third section interposed between the first and second sections and incorporating the first and second cross-sectional structures.

In accordance with additional or alternative embodiments, the web portion includes an I-beam cross-sectional structure and the spine portion and a base of the web portion form a gooseneck angle.

In accordance with additional or alternative embodiments, the lug portion includes a hinge-pin connector.

In accordance with additional or alternative embodiments, the first cross-sectional structure includes a central web having a plane substantially parallel with a longitudinal axis of the web portion, a first flange disposed between the web portion and a first side of the central web and a second flange disposed on a second side of the central web, which is opposite the first side.

In accordance with additional or alternative embodiments, the first flange includes an angular break and the second flange is tapered.

In accordance with additional or alternative embodiments, the second cross-sectional structure includes first and second lateral webs extending between the first and second flanges.

In accordance with additional or alternative embodiments, respective portions of the first and second lateral webs proximal to the web portion overlap with a corresponding portion of the central web.

According to yet another aspect of the disclosure, an engine cowling assembly is provided and includes an engine cowling, a door element, a first hinge connecting a first end of the door element to a complementary end of the engine cowling and a second hinge connecting a first end of the door element to a complementary end of the engine cowling.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

As will be described below, a cast metal part is provided with a hybrid cross-sectional structure that provides this part with additional strength and limited additional weight. This additional strength and limited additional weight allows the part to serve as a replacement for a machined part, despite being formed by way of a cast process, with a similar strength, geometry and weight of the machined part.

With reference to FIGS. 1-5, a beam 10 is provided and has a hybrid cross-sectional structure. The beam 10 includes a first axial section 11 at a first longitudinal end of the beam 10, a second axial section 12 at a second longitudinal end of the beam 10, which is opposite the first longitudinal end, and a third axial section 13. The first axial section 11 has a first cross-sectional structure 110 and the second axial section 12 has a second cross-sectional structure 120, which is different from the first cross-sectional structure 110. The third axial section 13 is axially interposed between the first axial section 11 and the second axial section 12 and has a third cross-sectional structure 130 that incorporates the first cross-sectional structure 110 and the second cross-sectional structure 120.

Figure 2:
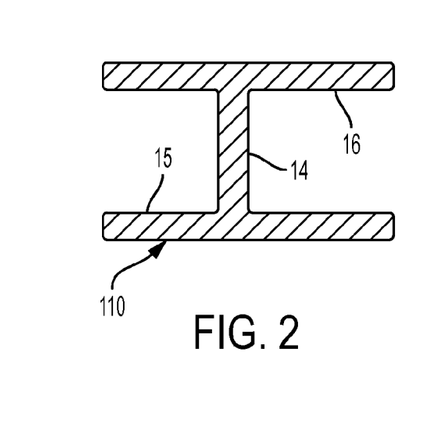
FIG. 2 is an axial view of a cross-section of the beam of FIG. 1 taken along line 2-2 of FIG. 1.
Figure 4:
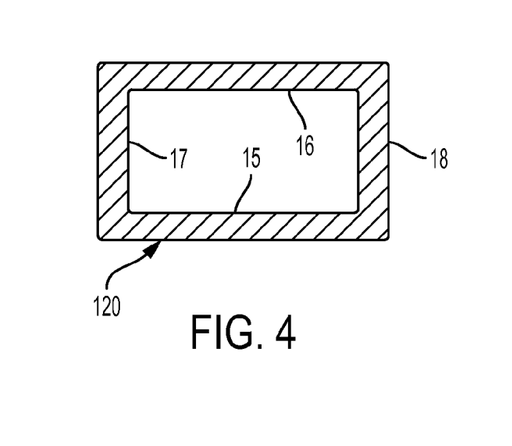
FIG. 4 is an axial view of a cross-section of the beam of FIG. 1 taken along line 4-4 of FIG. 1.

In accordance with embodiments, the first cross-sectional structure 110 may be provided as an I-beam structure and the second cross-sectional structure 120 may be provided as a box-beam structure. As such and, as shown in FIG. 2, the first axial section 11 may include a central web 14, a first flange 15 that is disposed on a first side of the central web 14 and a second flange 16 that is disposed on a second side of the central web 14, which is opposite the first side. As will be described below, with reference to the embodiments of FIGS. 8-12, the first flange 15 may include an angular break 150 (see FIG. 9) and the second flange 16 may be tapered 160 (see FIG. 8) along an axial portion thereof. The first and second flanges 15 and 16 extend beyond an end of the first axial section 11 and along the third axial section 13 and the second axial section 12. As shown in FIG. 4, the second cross-sectional structure 120 may include first and second lateral webs 17 and 18, which extend between the extensions of the first and second flanges 15 and 16.

Figure 3:
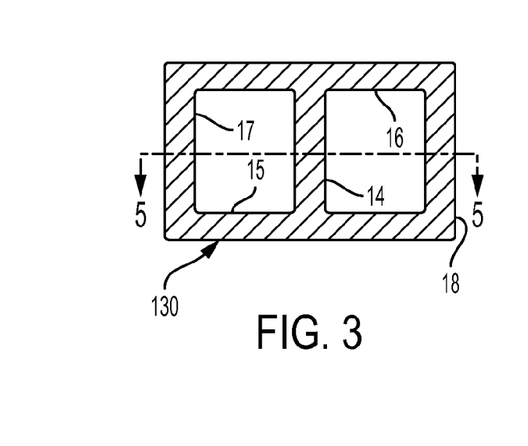
FIG. 3 is an axial view of a cross-section of the beam of FIG. 1 taken along line 3-3 of FIG. 1.
Figure 5:
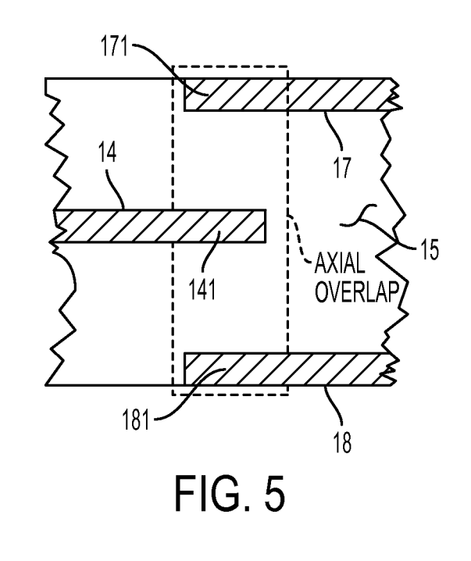
FIG. 5 is a plan view of a cross-section of the beam of FIG. 1 taken along ling 5-5 of FIG. 3.

The central web 14 and the first and second lateral webs 17 and 18 may be substantially parallel with one another with the central web 14 generally disposed equidistantly from each of the first and second lateral webs 17 and 18. As such and, as shown in FIGS. 3 and 5, respective axial portions 171, 181 of the first and second lateral webs 17 and 18 axially overlap with a corresponding axial portion 141 of the central web 14 at the third axial section 13.

Figure 1:
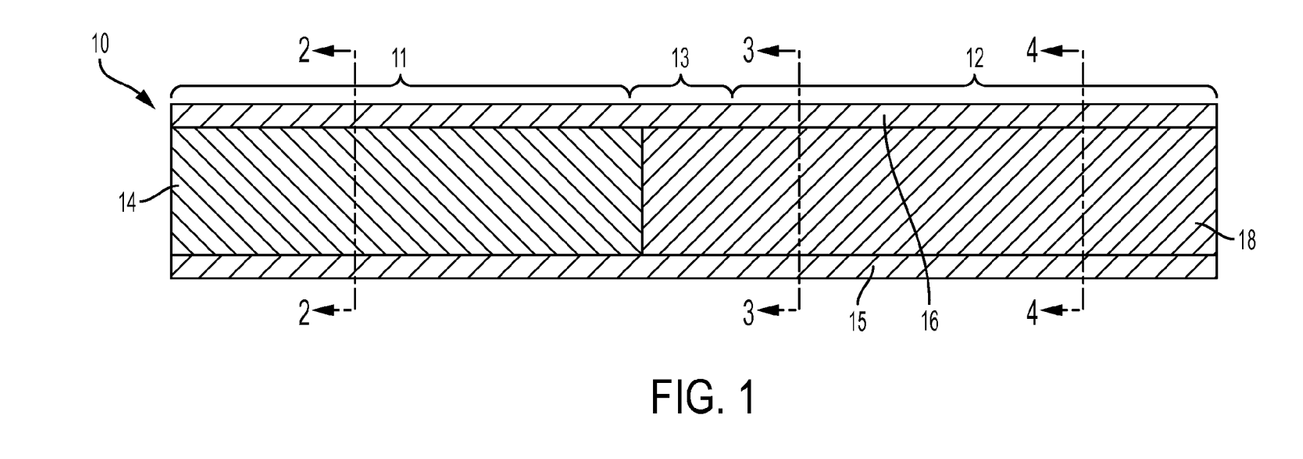
FIG. 1 is a side view of a beam with a hybrid cross-sectional structure in accordance with embodiments.

Owing to the above-described hybridization of the cross-sectional structure of the beam 10, the beam 10 has a geometry at the first axial section 11 that is configured to handle a certain type of loading of the beam 10 at the first axial section 11 and a different geometry at the second axial section 12 that is configured to handle a different type of loading of the beam 10 at the second axial section 12. Thus, an ability of the beam 10 to resist deformation under certain, differently applied/directed loads at different locations along a length of the beam 10 is increased as compared to similar material/length beams that are entirely provided with I-beam cross-sectional structures. Meanwhile, an overall weight of the beam 10 is reduced as compared to similar material/length beams that are entirely provided with box-beam cross-sectional structures. Thus, the beam 10 can be cast with designed thicknesses and an overall weight that would normally be associated with a machined part.

That is, while cast beams might normally need to be designed with a conservative casting factor and correspondingly thick and heavy components as compared to machined beams due to the fact that cast materials tend to have relatively low strength, this is not the case with the beam 10. Rather, as a result of the structure described above, the beam 10 has a load carrying capability and an overall weight normally associated with a machined beam.

In accordance with further embodiments, the beam 10 of FIGS. 1-5 may be incorporated into various structures such as, but not limited to, engine cowling door hinges of an aircraft engine nacelle. With this modification, the engine cowling door hinges are made stronger due to the hybridization of the cross-sectional structure of the beam 10 and thus can be cast with designed component thicknesses and an overall weight that would normally be associated with a machined part. That is, as noted above, while engine cowling door hinges that are produced by way of casting processes normally need to be designed with a conservative casting factor and correspondingly thick and heavy components as compared to machined engine cowling door hinges owing to the relatively low strength of cast materials, the engine cowling door hinges described below are cast produced but have a strength and an overall weight normally associated with machining.

Figure 6:
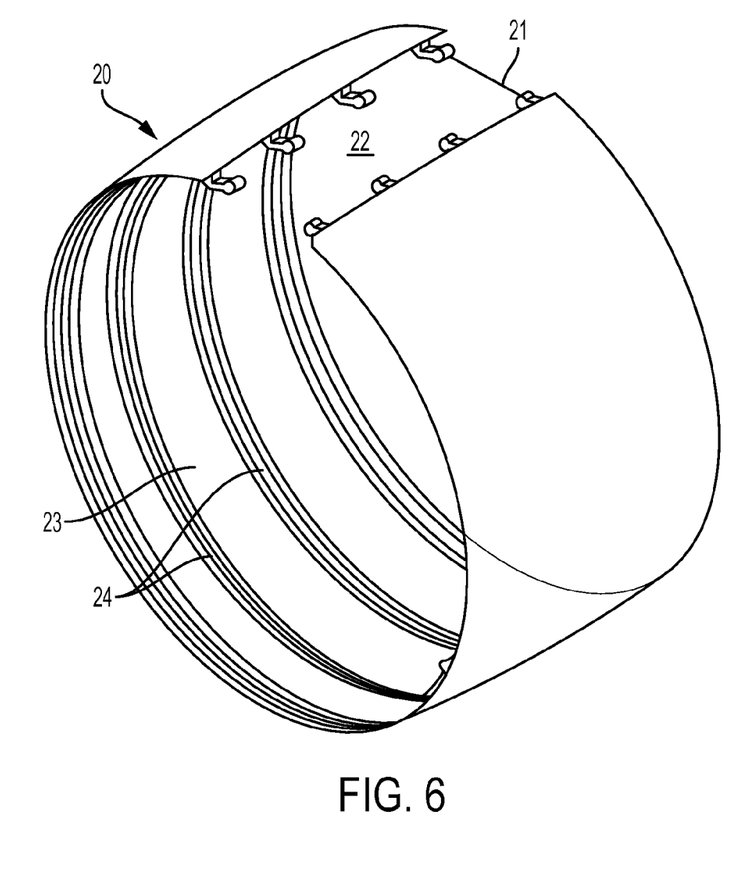
FIG. 6 is a perspective view of an engine cowling in accordance with embodiments.
Figure 7:
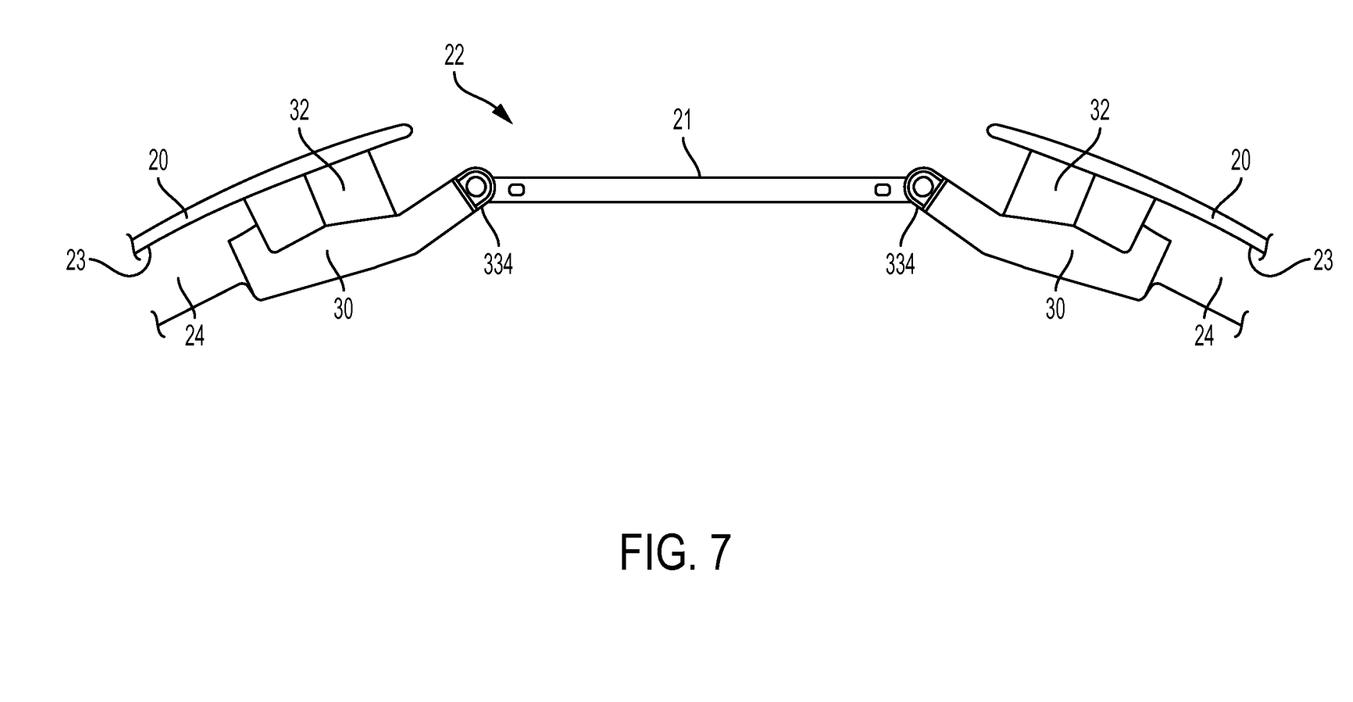
FIG. 7 is an axial view of a door and hinges of the engine cowling of FIG. 6.

As shown in FIGS. 6 and 7, a fan cowl assembly of a given engine nacelle includes two fan cowl halves 20 that are latched to one another along their bottom edges and are hinged to a supporting structure with hinges along their top edges. The fan cowl 20 provides for protection and access to fan case accessories, a start valve, a forward frame, a forward engine mount (in some cases) and inlet aft bulkhead. The fan cowl 20 also provides for an aerodynamic exterior surface between the inlet and a thrust reverser, a fire barrier if needed and strake support if needed. The fan cowl 20 has a partially annular shape with distal ends forming a frame structure region 22 and a slight taper forming a relatively narrow leading side, which is proximal to the inlet, and a relatively wide trailing side opposite the leading side. The aerodynamic exterior surface of the fan cowl 20 is generally smooth and the interior surface 23 is provided with longitudinal or circumferential support ribs 24. Hinges 30 are arranged along the top edges of the fan cowl halves 20. The two aft-most hinges 30 on each fan cowl half 20 may be tied to one another by a connecting rod 21.

With reference to FIGS. 8-12, each hinge 30 includes a spine portion 31, a web portion 32 disposed along the spine portion 31, and a lug portion 33 disposed at an end of the spine portion 31. The spine portion 31 may be formed with a structure similar to the beam 10 described above and may thus include a first axial section 40 having a first cross-sectional structure 401 (see FIG. 10), a second axial section 50 having a second cross-sectional structure 501 (see FIG. 12), which is different from the first cross-sectional structure 401, and a third axial section 60. As above, the third section 60 is axially interposed between the first axial section 40 and the second axial section 50 and has a third cross-sectional structure 601 (see FIG. 11) that incorporates the first cross-sectional structure 401 and the second cross-sectional structure 501.

In accordance with embodiments, the first cross-sectional structure 401 may be provided as an I-beam type of structure and the second cross-sectional structure 501 may be provided as a box-beam type of structure. As such, the first axial section 40 may include a central web 41, a first flange 42 that is disposed on a first side of the central web 41 and a second flange 43 that is disposed on a second side of the central web 41, which is opposite the first side. The first flange 42 may include the previously-mentioned angular break 150 (see FIG. 9) and the second flange 43 may be tapered 160 (see FIG. 8) along an axial portion 430 thereof. The first and second flanges 42 and 43 extend beyond an end of the first axial section 40 and along the third axial section 60 and the second axial section 50. The second cross-sectional structure 501 may include first and second lateral webs 51 and 52, which extend between the extensions of the first and second flanges 42 and 43.

The central web 41 and the first and second lateral webs 51 and 52 may be substantially parallel with one another with the central web 41 generally disposed equidistantly from each of the first and second lateral webs 51 and 52. As such, respective axial portions 511, 521 of the first and second lateral webs 51 and 52 axially overlap with a corresponding axial portion 411 of the central web 41 at the third axial section 60 (see FIG. 11).

Figure 9:
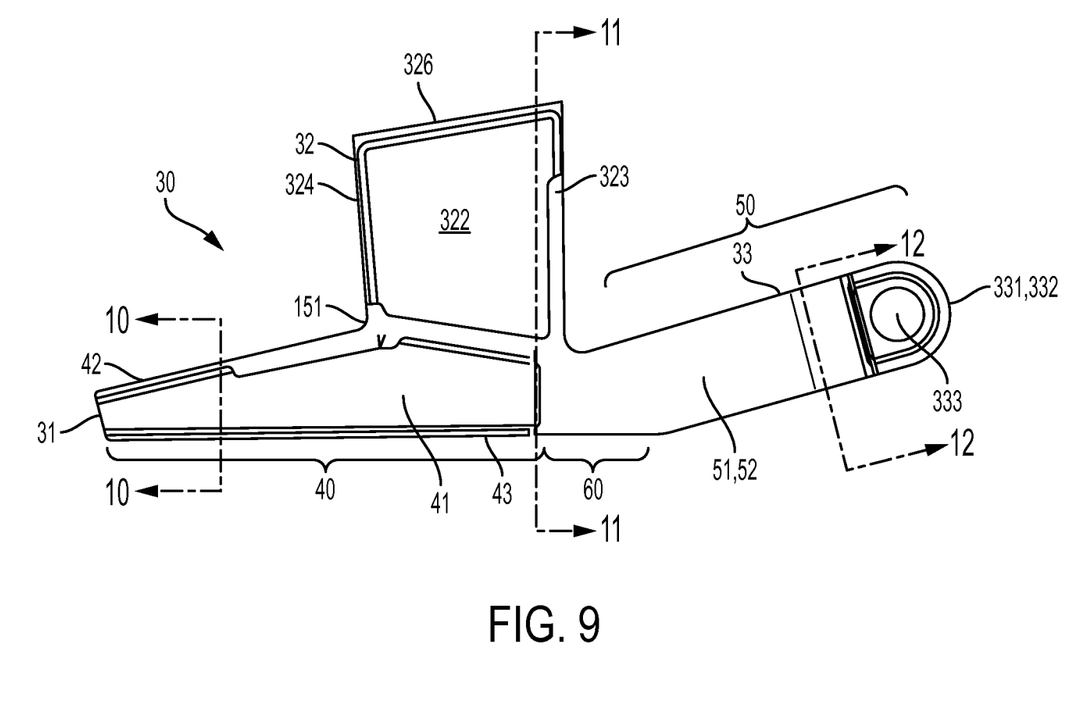
FIG. 9 is a side view of the hinge of FIG. 8.
Figure 10:
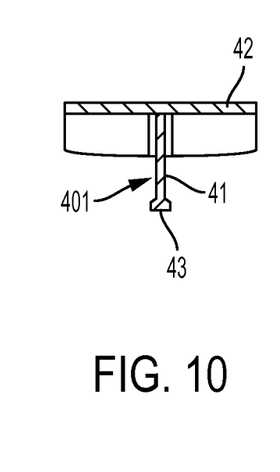
FIG. 10 is a cross-sectional view of the hinge of FIGS. 8 and 9 taken along line 10-10.
Figure 11:
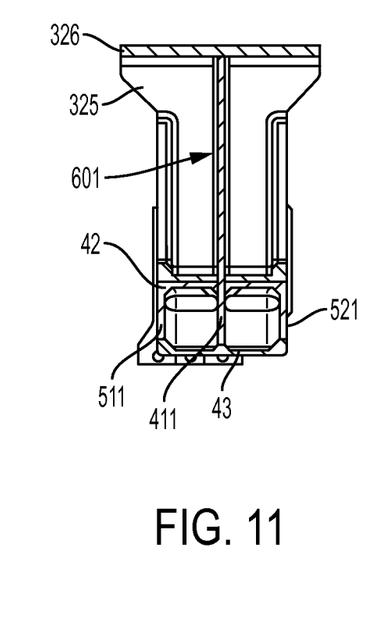
FIG. 11 is a cross-sectional view of the hinge of FIGS. 8 and 9 taken along line 11-11.
Figure 12:
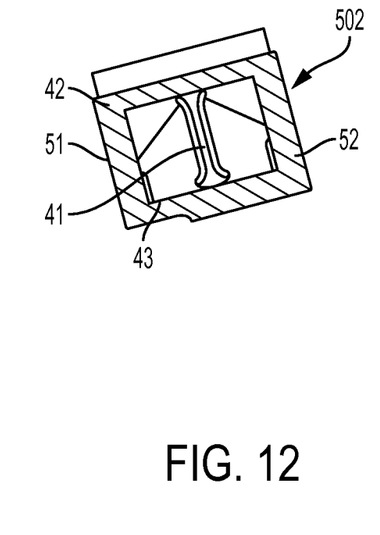
FIG. 12 is a cross-sectional view of the hinge of FIGS. 8 and 9 taken along line 12-12.

In accordance with embodiments, the central web 41 has a relatively short height at a distal end of the first axial section 40 and increases in height toward the angular break 150. Beyond the angular break 150, the central web 41 decreases in height. The first flange 42 may have a generally similar width along an axial dimension of the first axial section 40 but may be slightly narrowed along the web portion 32. The second flange 43 is relatively narrow as compared to the first flange 42 for most of the axial length of the first axial section 40 but increases in width by way of tapering along the axial portion 430.

The web portion 32 is coupled to the first flange 42 and extends away from the spine portion 31 along a longitudinal axis thereof. At an interface between the third axial section 60 and the second axial section 50, the spine portion 31 bends toward the web portion 32 and thus a base 320 of the web portion 32 and the spine portion 31 cooperatively form a gooseneck angle section 321. The lug portion 33 includes first and second lateral arms 331 and 332, which extend away from the spine portion 31 and may be respectively aligned with the first and second lateral webs 51 and 52. The first and second lateral arms 331 and 332 may be formed to define through-holes 333 that are configured to provide a pin-hinge connection 334 (see FIG. 7) with the door element 21.

The web portion 32 may have an I-beam structure with increasing distance from the base 320. As such, the web portion 32 may include a central web 322, which may have a longitudinal axis that is aligned and parallel with the central web 41, and first and second flanges 323 and 324 on opposite sides of the central web 322. The first flange 323 is proximal to the lug portion 33 and the second flange is remote from the lug portion 33. The first and second flanges 323 and 324 are generally uniform in width with increasing distance from the base 320 but include flanges 325 at distal ends thereof. The central web 322 and the flanges 325 terminate at a base portion 326.

When the hinge 30 is disposed in connection with the fan cowl 20, as shown in FIG. 7, respective exterior surfaces of the first flange 323 and the base portion 326 abut with the engine cowling 20. In particular, the exterior surface of the first flange 323 abuts with a complementary end of one of the longitudinal support ribs 24 and the exterior surface of the base portion 326 abuts with the interior surface 23.

Figure 8:
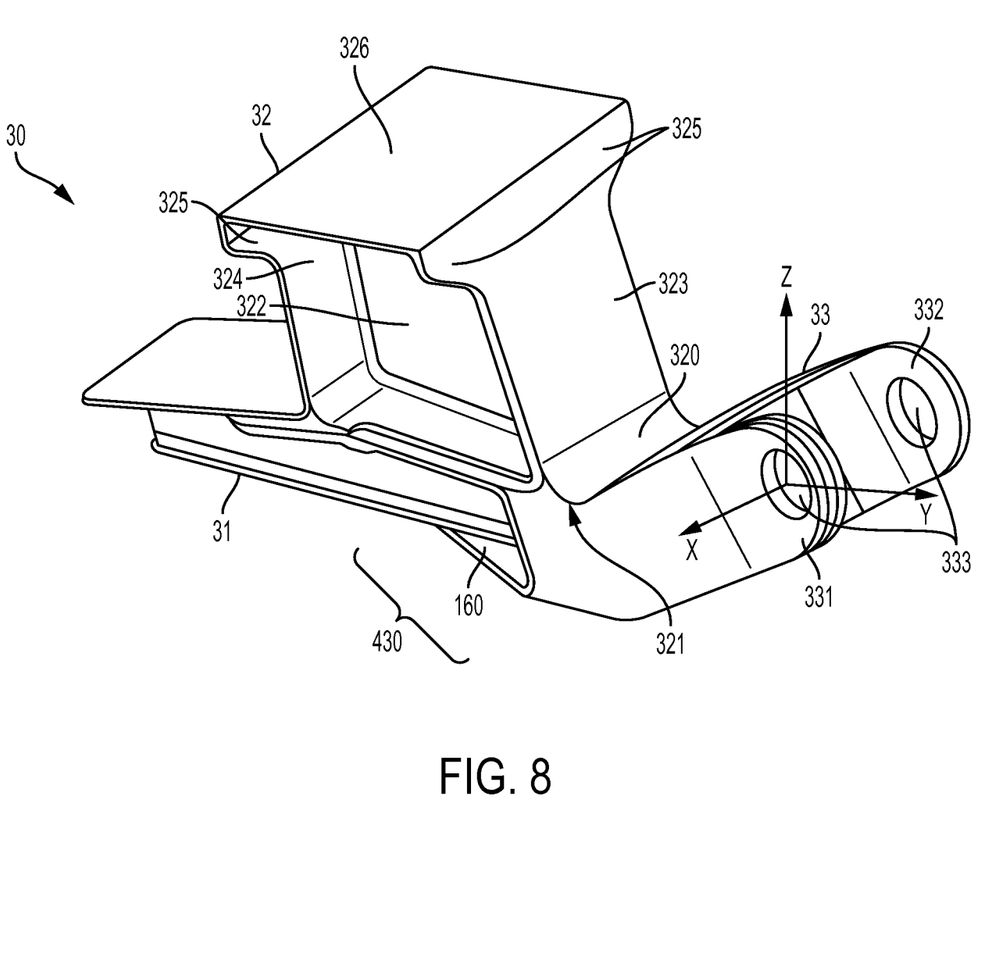
FIG. 8 is a perspective view of a hinge for use with the door and the engine cowling of FIGS. 6 and 7 in accordance with embodiments.

With particular reference to FIG. 8, when the hinges 30 are tied to one another by the connecting rod 21 (see FIGS. 6 and 7), loads are applied to the lug portion 33 (e.g., at the first and second lateral arms 331 and 332 and at the through-holes 333) with components in the X, Y and Z directions. These components will be hereinafter referred to as an X component, a Y component and a Z component. The Y component and the Z component are primary loads and the X component is a percentage of the vector sum of the Y and Z components. With this in mind, it is to be understood that the hinge 30 has the above-described gooseneck angle section 321 in order to properly connect the frame structure 21 to the fan cowl 20 but that the offset between from the lug portion 33 and the gooseneck angle section 321 would tend to cause bending about the axes associated with X and the Z direction and torsion about the axis associated with the Y direction if not for the structure of the hinge 30.

That is, the box-beam structure of the second cross-sectional structure 501 serves to efficiently transfer torsional loading through the gooseneck angle section 321 such that torsional loading can reacted as a couple into the exterior surface of the first flange 323. The transition from this box-beam at the second axial section 50 to the I-beam structure of the first axial section 40 allows for weight savings over the length of the hinge 30 with the I-beam structure at the first axial section providing for support in the Y and Z directions.

Figure 13:
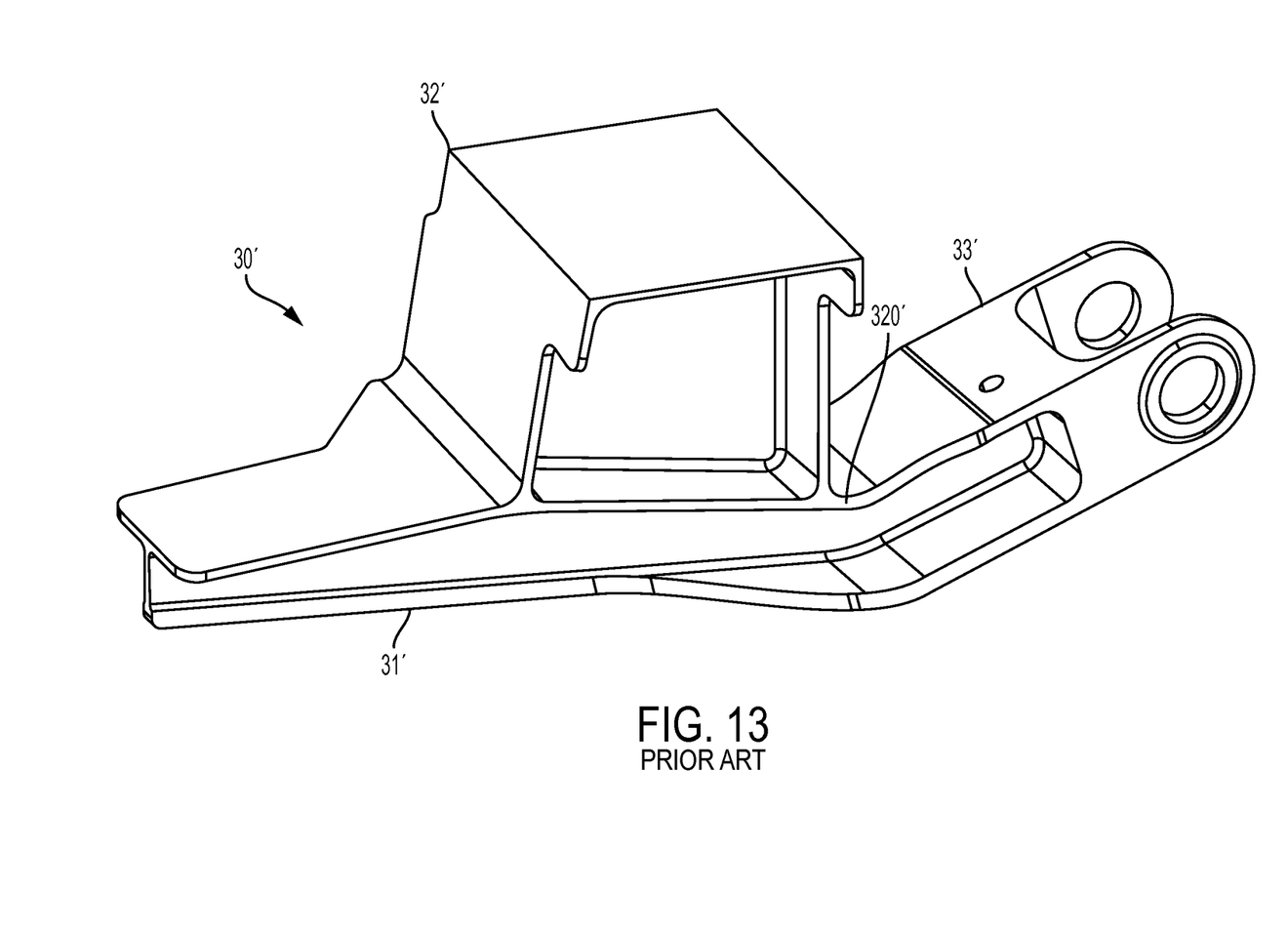
FIG. 13 is a prior art hinge for use in a fan cowl assembly that has only a single cross-sectional structure along its spine portion.

For comparison, a conventional prior art hinge 30' is illustrated with reference to FIG. 13. As shown in FIG. 13, the prior art hinge 30' includes a spine portion 31', a web portion 32' and a lug portion 33'. However, where the spine portion 31 of the above-described hinge 30 has a hybridized cross-sectional structure, the spine portion 31' of the prior art hinge 30' has an I-beam cross-sectional structure along an entire length thereof. As such, the prior art hinge 30' is unable to react to torsional loading as well as the hinge 30 and thus must either be machined or cast with larger component dimensions. Even when casted with large component dimensions, the prior art hinge 30' may not be able to achieve similar performance characteristics as the above-described hinge 30. Indeed, where the prior art hinge 30' is cast, an area of the second axial section 50' at the gooseneck angle section 321' may be about 2.25 in$^2$ and a local torsional constant may be about 0.707 in$^4$. By contrast, the area of the second axial section 50 at the gooseneck angle section 321 of the above-described hinge 30 may be about 1.57 in$^2$ and a local torsional constant may be about 2.1824 in$^4$.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

I claim:

1. A hinge, comprising:
a spine portion;
a web portion disposed along the spine portion; and
a lug portion disposed at an end of the spine portion, the spine portion comprising:
a first section having a first cross-sectional I-beam structure;
a second section having a second cross-sectional box-beam structure; and
a third section interposed between the first and second sections and incorporating the first and second cross-sectional structures.

2. The hinge according to claim 1, wherein the web portion comprises an I-beam cross-sectional structure and the spine portion and a base of the web portion form a gooseneck angle.

3. The hinge according to claim 1, wherein the lug portion comprises a hinge-pin connector.

4. The hinge according to claim 1, wherein the first cross-sectional structure comprises:
a central web having a plane substantially parallel with a longitudinal axis of the web portion;
a first flange disposed between the web portion and a first side of the central web; and
a second flange disposed on a second side of the central web, which is opposite the first side.

5. The hinge according to claim 4, wherein the first flange comprises an angular break and the second flange is tapered.

6. The hinge according to claim 4, wherein the second cross-sectional structure comprises first and second lateral webs extending between the first and second flanges.

7. The hinge according to claim 6, wherein respective portions of the first and second lateral webs proximal to the web portion overlap with a corresponding portion of the central web.

8. An engine cowling assembly, comprising:
an engine cowling;
a door element;
a first hinge according to the hinge of claim 1 connecting a first end of the door element to a complementary end of the engine cowling; and
a second hinge according to the hinge of claim 1 connecting a first end of the door element to a complementary end of the engine cowling.

* * * * *